United States Patent [19]

Burns et al.

[11] Patent Number: 4,664,052

[45] Date of Patent: May 12, 1987

[54] AUTOMATIC VEHICLE CONTROL METHOD

[75] Inventors: Roland S. Burns, Plymouth, England; Michael J. Dove, Par, United Kingdom

[73] Assignee: Poly Enterprises Plymouth Limited, Plymouth, England

[21] Appl. No.: 784,013

[22] Filed: Oct. 4, 1985

[30] Foreign Application Priority Data

Oct. 9, 1984 [GB] United Kingdom ............... 8425442

[51] Int. Cl.$^4$ ............................................. B63H 25/02
[52] U.S. Cl. ................................. 114/144 E; 364/447
[58] Field of Search ................... 114/144 E; 364/443, 364/447

[56] References Cited

U.S. PATENT DOCUMENTS 2,751,541  6/1956  Schuck .......................... 364/447 X
3,436,531  4/1969  Throckmorton .................. 364/443
3,771,483  11/1973  Bond ............................. 114/144 E Primary Examiner—Sherman D. Basinger
Attorney, Agent, or Firm—Robbins & Laramie

[57] ABSTRACT

A control system for causing a vehicle, such as a ship, to follow a track comprising track segments TS1, TS2 whose position and heading are specified, in accordance with a weighted function of track error and heading error. On changing from following a track segment TS1 to the next segment TS2 at P1 the vehicle will overshoot, as shown by curve A. The invention provides for the weighting factor for the heading to be temporarily increased when the vehicle changes track segments, thus reducing the overshoot as shown by curve B. A further improvement, indicated by curve C, is obtained by fixing the changeover point at P2, in advance of the track segment intersection, the amount of the advance being a function of vehicle characteristics and speed.

9 Claims, 5 Drawing Figures

AUTOMATIC VEHICLE CONTROL METHOD

The present invention relates to a method of automatically controlling a vehicle to follow a desired track.

Although the main application envisaged for the control method of the invention is in the pilotage of ships, the term "vehicle" as used herein is intended to include not only ships, but also unrestrained land vehicles, aircraft and space vehicles.

BACKGROUND OF THE INVENTION

It is known to effect automatic control of a vehicle with a view to causing the vehicle to follow a desired track the defining parameters of which have been previously memorised. Such control may be implemented on an optimal control basis in which the control process is effected in a manner optimising a performance criterion; typically, this performance criterion might be a function of the vehicle track error (that is, the error between the desired track and the vehicle's actual track) the control process being designed to minimise the value of the performance criterion.

The application of optimal control theory to ships has, in the past, been primarily in relation to fuel conservation in large vessels and comparatively little research and development effort has been put into the problem and automatic track keeping. One recent paper that does deal with automatic track keeping for ships was presented in October 1982 at a conference held at the Royal Naval Engineering College, Manadon, Plymouth, England, this paper being part-authored by the present inventors and being entitled "Automatic Pilotage of Large Ships in Confined Waters—A Multivariable Approach". The paper sets out in clear mathematical terms the general nature of an optimal control process to which the present invention may be applied.

In implementing automatic pilotage of a vessel, an important consideration is how best to effect a change over between following one segment of the desired track to following a subsequent segment having a different heading.

It is an object of the present invention to facilitate the implementation of changes in track in an automatic pilotage system based on an optimal control process such as described in the above-mentioned Paper.

SUMMARY OF THE INVENTION

According to one aspect of the present invention, there is provided a method of automatically controlling a vehicle to follow a desired track make up of a plurality of track segments, the method comprising the steps of:
  determining the current position and heading of the vehicle,
  deriving a track-error parameter representative of the lateral offset between the vehicles current position and the track segment currently being followed,
  deriving a heading-error parameter representative of the difference between the vehicle's current heading and the direction of the said track segment currently being followed,
  deriving a performance criterion based on weighted functions of the track and heading error parameters, and
  controlling the vehicle to follow said track in accordance with an optimal control process based on said performance criterion,
  the identity of the track segment being followed being changed over from one track segment to the next upon the vehicle reaching a corresponding way-change point pre-defined along the said one track segment, and the weightings of the track and heading error functions used in said performance criterion being adjusted, for the duration of an initial phase of following each track segment, to increase the significance of the heading error function during that phase.

As a result of the increased significance of heading error during the initial phase of following a track segment, the vehicle is turned onto the new track heading more rapidly than would otherwise be the case.

The position of the way-change point along a track segment may be predefined in any one of several different ways. Thus in the simplest case, the way-change point is defined as lying at the intersection of the current and next following track segments; such a location for the way-change point is not preferred, however, as it results in the vehicle overshooting significantly the next track segment to be followed. Accordingly, the way-change point is preferably positioned along the current track segment in advance of the point of intersection of this segment with the next one; in this manner it is possible to reduce or eliminate overshoot in turning onto the next track heading.

Of course, the turning characteristics of a vehicle will usually depend on variables, such as vehicle speed, mass, resistance to turning, etc. As a result, the optimum position of the way-change point will generally not have a fixed value, but will depend on the values of the above-mentioned variables. Accordingly, in a preferred implementation of the control method of the invention, each way-change point is predefined relative to the intersection of the current and next-following track segments, not as a fixed advance, but as an advance whose magnitude is a function of the vehicle's velocity and response characteristics (i.e. mass, turning resistance, etc). In this manner, the vehicle can be brought onto a new track segment with the minimum of under- or over- shoot without the need either to precalculate appropriate way-change points or to modify the track to be followed.

As described above, the significance of the heading error function is temporarily increased during the initial phase of following a track segment; at the end of this initial phase, the significance of the heading error function is reduced to its former level. The termination of the initial phase can be defined in a number of ways, for example in terms of time or distance travelled; however, preferably the initial phase is terminated when the heading error has been reduced to a preset value, such as 30°.

In another aspect, the present invention further provides control apparatus for implementing the control method of the invention.

The control method of the invention is particularly suitable for the automatic pilotage of a large ship.

DESCRIPTION OF THE DRAWINGS

A ship control method in accordance with the invention will now be particularly described, by way of example, with reference to the accompanying diagrammatic drawings, in which.

DESCRIPTION OF THE INVENTION

Figure 1:
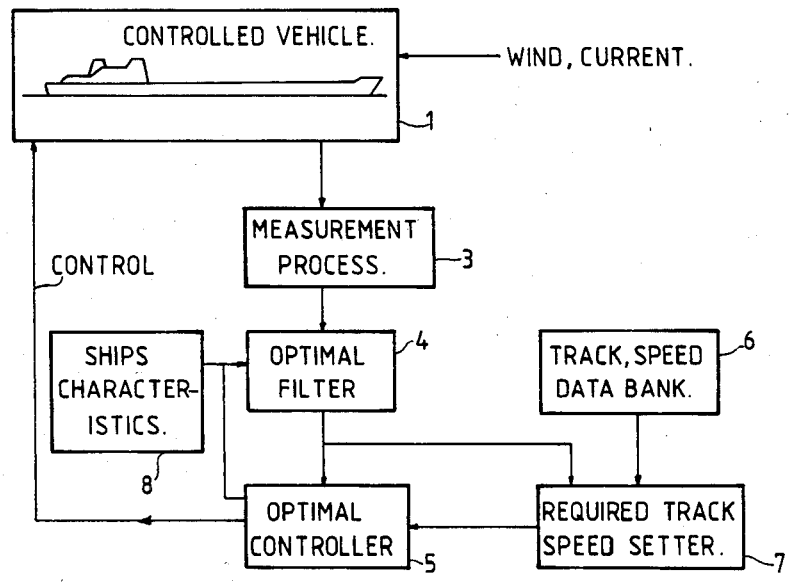
FIG. 1 is a functional block diagram of a prior art optimal control system for effecting automatic pilotage of a ship.

FIG. 1 shows in functional block diagram form a prior art automatic pilotage system such as is described in the above-mentioned Paper part-authored by the present inventors. As can be seen, the system is arranged to control a ship 1 subject to external influences such as wind and current, the control variables being engine speed and rudder angle (referenced simply "control" in FIG. 1).

The condition of the ship 1 is described by a number of state variables (such as position, velocity, heading etc) which are generally inter-related of the through the equations of motion. It is the purpose of the control system (a) to determine as nearly as possible the values of these state variables, (b) to compare these values with desired values of the state variables, and (c) as a result of this comparison to make appropriate adjustments to the engine speed and rudder angle to minimise the difference between the desired and determined values of the state variables.

The process of determining a "best estimate" of the state variables is carried out in two stages, namely a measurement process and an optimal filtering process as represented by blocks 3 and 4 in FIG. 1. The measurement process involves the use of position, speed and heading measuring equipment to measure the corresponding variables. Thus, the ships position may be determined by inertial navigation equipment, by radar, by radio location, or any other suitable means; the ships speed can be determined by means of an electro-magnetic or pressure log and/or a sonar doppler system; and the ships heading can be obtained from a gyro compass. Note that given an accurate initial position fix the ship's subsequent position can be determined from its speed and heading. Of course, the measurement process is subject to a number of errors and, in addition, where the ship's position and speed are measured through the water rather than relative to land, the effects of wind and current will introduce further discrepancies between the actual and measured values of the state variables. Accordingly, in order to produce a better estimate of the state variable values, the measured values are fed to an optimal filter ( for example, a Kalman filter) also supplied with statistical data on the measurement errors data relating the wind and current, and data on the ship's characteristics (from block 8). In practice, optimal filtering is achieved by suitable processing of the measured state variable values in digital processing electronics operating under software control. The values of the state variables output from the optimal filter 4 are best estimate values of these variables.

A more detailed description of the operation of the optimal filter block 4 will not be given herein as such filters are well known to persons skilled in the control engineering art and are fully described in the appropriate technical literature.

The best estimate values of the state variables are passed to an optimal controller (function block 5) to which are also fed the desired values of the state variables of concern. In the present example, it is desired to have the ship follow a predetermined track at predetermined speed values; track information takes the form of data on absolute position and track heading. The desired values of track and speed are held in a data bank 6 and are retrieved therefrom by means of a track and speed setter 7 in accordance with the ship's current position or, more precisely, in accordance with the best estimate of this position. The retrieved data on required track and speed as passed by the setter 7 to the optimal controller 5 for comparison with the best estimate values of track and speed (the variables of track being among the measured state variables along with the ship's speed).

The optimal controller 6 determines what values of engine speed and rudder angle are required in order to being the ship onto its desired track and speed. Due to the practical limits on engine power and rudder effectiveness, it is not, of course, possible to control the ship to precisely follow the desired track at the desired speed at all times. However, in seeking to achieve this goal, it is possible to arrange for the controller 6 to optimise the performance of the ship, given its limitations, in terms of a selected performance criterion. To achieve this optimisation, the controller 6 effectively carries out a prediction of the ship's reaction to various possible control values (engine speed and rudder angle settings) and determines which set of values produces the best response in terms of the aforesaid performance criterion. This prediction process in practice involves the processing of mathematical equations modelling the ship, the ship's particular characteristics being expressed as parameters of these equations.

As already mentioned, the output of the optimal controller takes the form of demand values for engine speed and rudder angle.

The performance criterion used by the optimal controller 6 may include terms relating to how far the ship is from its desired track and speed. Thus, the performance criterion may include a term which is a function of the lateral track error T (that is, the lateral distance between the ship's best estimate position and the desired track—see FIG. 2), a term which is a function of the ship's heading error φ (the difference between the ship's best estimate heading and its desired heading), and a term which is a function of the ship's speed error V (that is the difference between the best estimate and desired values of the ship's speed). Typically, these functions are time integrals of the error values squared with different weightings being applied to the different functions. Thus, the performance criterion S may be represented by:

$$S = \int [W_1 f(T^2) + W_2 f(\phi^2) + W_3 f(V^2)] dt$$

where $W_1$, $W_2$, and $W_3$ are weighting factors. This performance criterion is termed a loss function and the optimal controller 5 seeks to minimise the value of the loss function.

The actual values assigned to the weighting factors $W_1$, $W_2$, $W_3$ depend on which error is considered the most undesirable; thus, for example, the value of the weighting factor $W_1$ may be made the largest in order to give the lateral track position error T pre-eminence in the performance criterion so that the optimal controller will seak primarily to minimise this error in preference to the heading error φ and the velocity error V.

As already mentioned, the track to be followed by the ship is stored in the data bank 6 in terms of position and heading data. The required track may typically comprise a plurality of linear track segments meeting at predetermined track interception points; in FIG. 2 two track segments TS1 and TS2 are shown, these segments meeting at point P1.

Figures 2, 3:
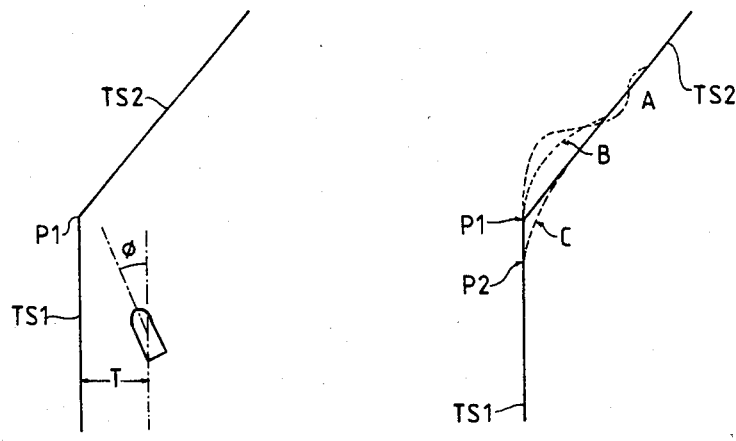
FIG. 2 is a diagram illustrating the derivation of track and heading error parameters T,φ of a ship given the actual position and desired track of the ship.
FIG. 3 is a diagram illustrating in dashed lines the track-following capabilities of a ship when controlled according to three different control methods.

Dashed curve A shown in the track diagram of FIG. 3 illustrates the possible course followed by a ship when changing over from following the track segment TS1 to following the track segment TS2 under the control of the FIG. 1 control system. In implementing the course change, the control system has maintained the ship on track segment TS1 right up until the track intersection point P1 whereupon the control system has switched to using the track position and heading values of track segment TS2 as the required track values; as a result, substantial overshoot occurs past the new desired track TS2 before the ship is brought back onto the desired track. Furthermore, due to the pre-eminence of the lateral track error in the performance criterion S, when the ship is first brought back onto the desired track TS2, its heading is incorrect so that there is now some overshoot in the opposite direction before the ship finally settles onto track TS2.

The purpose of the present invention is to facilitate bringing the ship round onto a new desired track when under automatic control.

Figure 4:
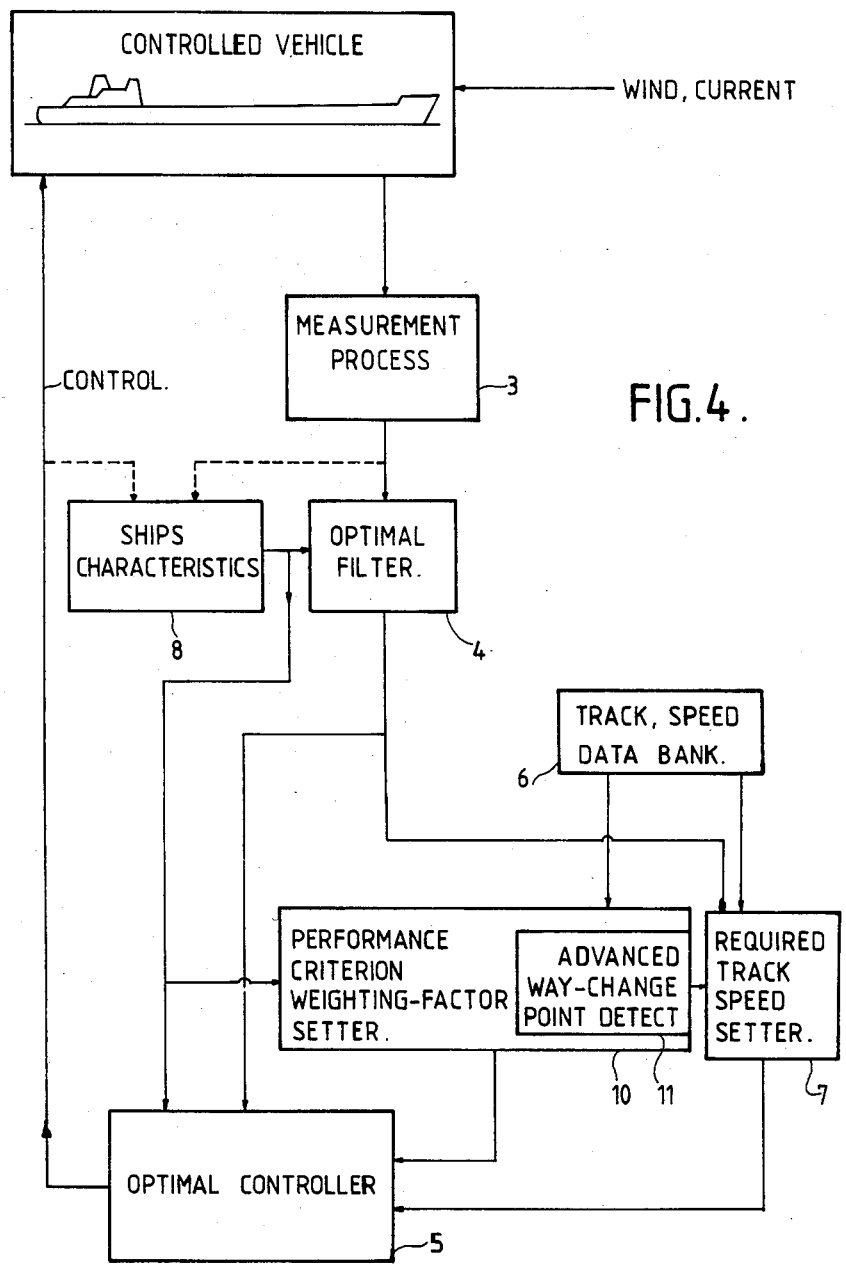
FIG. 4 is a functional block diagram of an optimal control system for implementing the ship control method of the invention.

FIG. 4 illustrates the functional blocks of a control system implementing a control method of the invention. Like the FIG. 1 system, that shown in FIG. 4 includes a measuring process functional block 3, an optimal filter block 4, a track, speed data bank 6, a required track and speed setter 7, and an optimal controller 5 arranged to receive both the best estimate values of the ship's state variables from the optimal filter 4 and also the required values of the state variables from the setter 7. In addition, the FIG. 4 system includes a block 10 for adjusting the weighting factors of the performance criterion used by the optimal controller.

The purpose of the block 10 is to reduce the size of overshoot that occurs when the ship 1 turns onto a new heading. This is achieved by temporarily increasing the significance of heading error within the performance criterion S during the initial phase of following a new track segment, that is, during the phase when the ship is turning onto the heading of the segment; once the new required heading has been achieved, the pre-eminence of the lateral track error in the performance criterion is restored. Curve B of FIG. 3 illustrates the possible track of the ship 1 when changing from following track segment TS1 to TS2 under a control scheme in which the heading error weighting factor is given increased significance from the poit P1 until the leading error φ is within a predetermined angle of the new track heading. As can be seen, the size of overshoot in this case is less than for the case where the ship is controlled by the FIG. 1 system (curve A). A further improvement in the course-changing characteristics of the ship under automatic control can be effected by advancing the point at which the ship is given the parameters of the new track segment to be followed. In other words, rather than waiting until the ship has reached the track intersection point P1 in FIG. 3 before supplying the optimal controller with the track values of the track segment TS2, the track values are supplied to the optimal controller at an advanced way-change point P2. In this manner, the ship can be caused to follow curve C when changing from following track segment TS1 to following track segment TS2. Curve C is clearly a more desirable real track than either curve A or B.

In order to implement the above-described process in which track changing is initiated at an advanced way-change point P2 with the weighting factors being adjusted in favour of heading error at this point, the weighting factor setter block 10 includes a functional block 11 for determining whether the ship has reached the advanced way-change point P2. This functional block 11 operates by determining whether the ship's best estimate position is within a certain distance of the next track intersection point as given by the data held in the data bank 6. When the ship 1 is determined to be at point P2, the block 11 causes the weighting factor setter to change the values of the weighting factor fed to the optimal controller 5 and, in addition, causes the track and speed setter 7 to feed to the controller 5, data on the track and speed required for the next track segment (segment TS2 in FIG. 3).

The optimum value for the separation of the advanced way-change point P2 and the track intersection point P1 will depend on factors such as the ship's speed and current handling characteristics (for example, the more heavily laden the ship, the greater its turning circle at a given speed). Accordingly, in determining the position of the advanced way-change point P2, the functional block 11 takes into account the ship's speed and characteristics.

Figure 5:
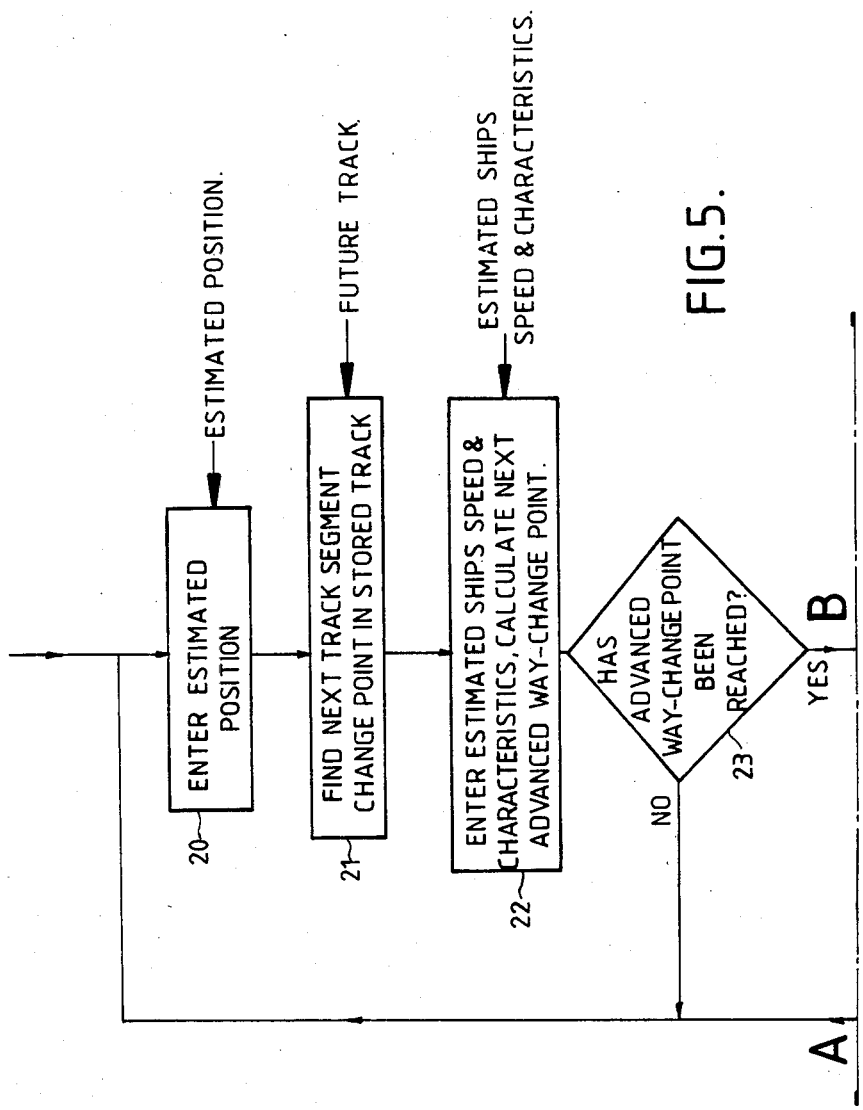
FIG. 5 is a flow chart illustrating the operation of the weighting-factor-setter block depicted in FIG. 4.
Figure 5:
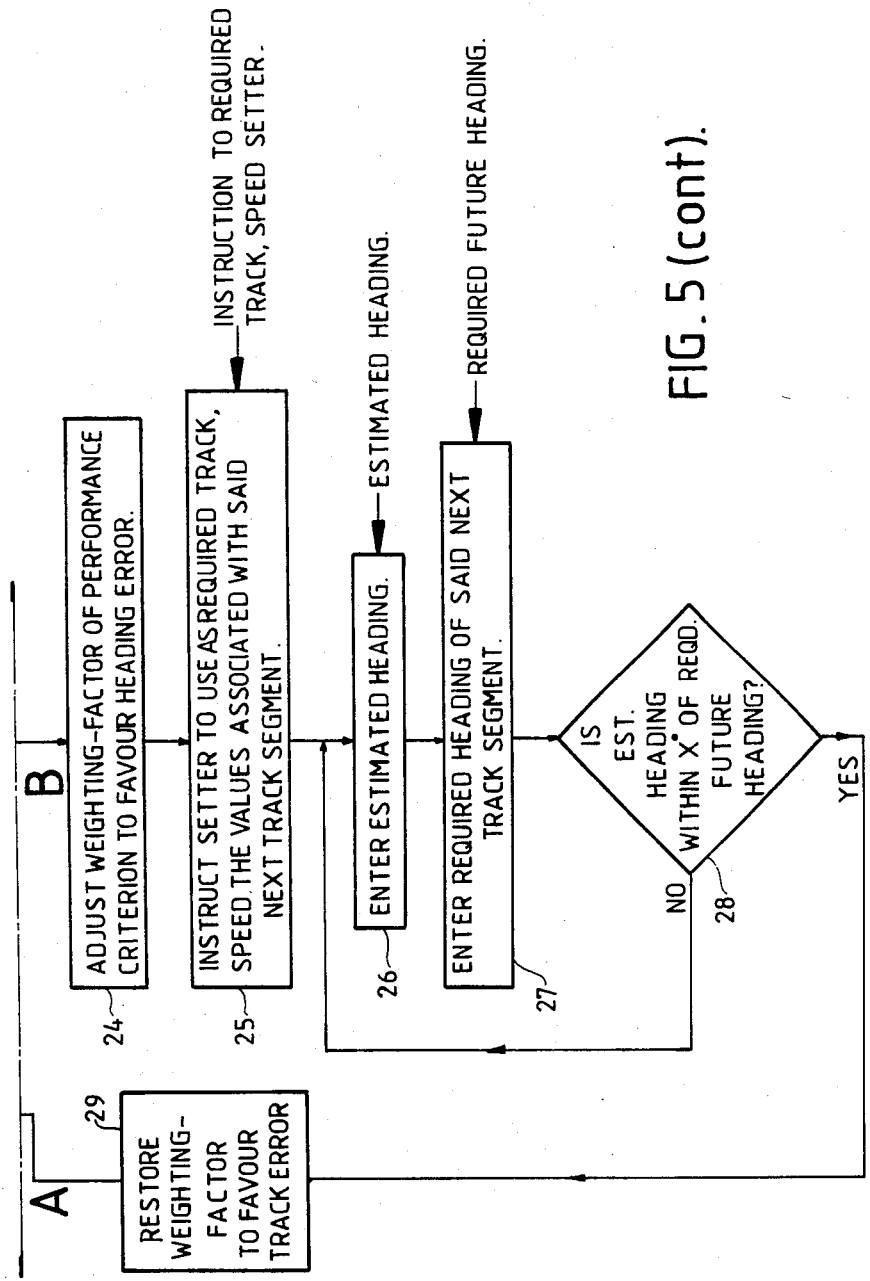

The operation of the functional block 10 is illustrated in flow chart form in FIG. 5. As can be seen, the first step in the operational cycle of block 10 is the reading in of the best estimate of the ship's current position as output from the optimal filter 4 (see box 20). This best estimate of position is used by block 10 to determine from the data held in the data bank 6 the next track segment intersection point P1 (see box 21). Next, the ship's current speed and characteristics are used to calculate the optimal advance for the point P2 relative to the point P1 (box 22). The ship's current position and the determined position of the advanced way-change point P2 are then compared (box 23). If the advanced way-change point has not been reached then the above-described processing steps are re-iterated; however, if the point P2 has been reached then the following processing steps are undertaken.

Upon point P2 being reached, the values of the weighting factors $W_1$, $W_2$, and $W_3$ are adjusted in favour of the heading error weighting factor $W_2$ (box 24) and an instruction is sent to the required track and speed setter 7 to cause the latter to supply to the controller 5, track and speed data relevant to the next track segment (box 25). Thereafter, the block 10 reads in the current estimate of the ship's heading (box 26) and the required heading for the next track segment (box 27). These two heading values are compared (box 28) and if they are within x degrees of each other the block 10 terminates the initial phase of following the new track segment as the ship's heading has been brought close to that required on the new track; if the actual and desired values of the ship's heading differ by greater than x degrees then the block 10 re-iterates the process of reading in and comparing these ships heading values. x may, for example, have a value of 30 degrees.

Upon termination of the initial phase of following the new track, the weighting factors of the performance criterion are returned to their previous values with the weighting factor $W_1$ being such as to give preeminence to the lateral track error term of the performance criterion (box 29). The operation of the block 10 then starts anew.

It will, of course, be appreciated that the block 10, like the blocks 4 to 8, will generally be implemented by digital processing electronics operating under program control.

As is indicated by the dashed lines leading to block 8 in FIG. 4, the ship's characteristics may be dynamically determined by comparison of the controls output by the optimal controller 5 and the results of the measurement process.

It will be appreciated that the control method described above with reference to FIGS. 4 and 5 could with suitable adaptions be equally applied to automatic track following for land vehicles, aircraft and space vehicles. Furthermore, various modifications to the control method described with reference to FIGS. 4 and 5 can, of course, be made; thus, for example, the end of the initial phase of following a new track segment, that is, the phase in which the heading error is predominant in the performance criterion, may be determined in a manner different to that described above, for example, by measuring the time lapsed or distance travelled from the advanced way-change point P2.

We claim:

1. A method of automatically controlling a vehicle to follow a desired track made up of a plurality of intersecting track segments, a respective way-change point for each of said intersecting track segments being defined along one of said track segments before said intersection thereof, the position of said way-change point being defined by current handling characteristics of said vehicle, the method comprising the steps of:
   determining the current position and heading of the vehicle,
   deriving a track-error parameter representative of the lateral offset between the vehicle's current position and the track segment currently being followed,
   deriving a heading-error parameter representative of the difference between the vehicle's current heading and the direction of the said track segment currently being followed,
   deriving a performance criterion based on weighted functions of the track and heading error parameters, and
   controlling the vehicle to follow said track in accordance with an optimal control process based on said performance criterion,
   wherein the vehicle is controlled, in dependence upon both said track-error parameter and said heading error parameter, to switch from following one track segment to following the next track segment on reaching a said way-change point in said one track segment, the weightings of said functions of said track-error and heading-error parameters being adjusted to increase the significance of said function of the heading-error parameter during an initial phase of following said next track segment.

2. A method of automatically controlling a vehicle to follow a desired track according to claim 1 in which said initial phase of each track segment being followed terminates when said difference between the current heading of the vehicle and the desired heading corresponding to the track being followed falls to a pre-set value.

3. A method of automatically controlling a vehicle to follow a desired track according to claim 2 wherein the said pre-set value is 30°.

4. A method of automatically controlling a vehicle to follow a desired track according to claim 1 in which each said way-change point is pre-defined relative to the intersection of the current and next following track segments as an advance whose magnitude is a function of the velocity and response characteristics of the vehicle.

5. An automatic control system for controlling a vehicle to follow a desired track made up of a plurality of intersecting track segments, a respective way-change point for each of said intersecting track segments being defined along one of said track segments before said intersection thereof, the position of said way-change point being defined by current handling characteristics of the vehicle, the system including:
   measuring means for measuring the position and heading of the vehicle,
   a data bank storing position and heading data defining the desired track segments,
   track setting means for retrieving from the data bank desired track data in accordance with the current position of the vehicle in relation to said way-change points, and
   a controller deriving track and heading error parameters from the measured position and heading and the retrieved data, and providing control signals for controlling the vehicle in accordance with a performance criterion based on weighted functions of the track and heading error parameters,
said controller being provided with means to switch the vehicle from following the next track segment on reaching a said way-change point in said one track segment in dependence upon both said track-error parameter and said heading-error parameter, means being provided for adjusting the weightings of said functions of said track-error and heading error parameters to increase the significance of said function of the heading error parameter during an initial phase of following said next track segment.

6. An automatic control system according to claim 5 further including means for determining when the vehicle has reached a way-change point in advance of the next track intersection point, and thereupon to change the said weighting factors and to cause the track setting means to supply to the controller the positions and heading data for the next track segment.

7. An automatic control system according to claim 6 which includes means for setting the response characteristics of the vehicle, and means for calculating, from the velocity and response characteristics of the vehicle, an optimum position for the way-change point.

8. An automatic control system according to claim 5 further including means for measuring the vehicle speed, and in which the data bank stores a desired speed for each track segment, and the control signals provided by the controller include a signal ocntrolling vehicle speed.

9. An automatic control system according to claim 8 in which the controlled vehicle is a ship and the measuring means includes an optimal filter supplied with data on wind and current and on the ship's characteristics and arranged to provide best estimate values of speed, position and heading.

* * * * *